United States Patent [19]

Measures et al.

[11] Patent Number: 5,469,265
[45] Date of Patent: Nov. 21, 1995

[54] METHOD AND APPARATUS FOR AN OPTOELECTRONIC SMART STRUCTURE INTERFACE WITH WAVELENGTH DEMODULATION OF LASER SENSORS

[76] Inventors: Raymond M. Measures, 214 Valleymede Drive, Richmond Hill, Ontario, Canada, L4B 2A6; Tino Alavie, 161 Bestview Drive, Willowdale, Ontario, Canada, M2M 2Y4; Serge M. Melle, 6255 Beaulieu Rue. Apt. #1, Montréal, Québec, Canada, H4E 3E9; Trent Coroy, 127 Goerzen Street, Saskatoon, Saskatchewan, Canada, S7K 6V6; Beck Mason, 76 Glengrove Avenue West, Toronto, Ontario, Canada, M4R 1N9; Shawn E. Karr, 161 Bestview Drive, Willowdale, Ontario, Canada, M2M 2Y4; Kexing Liu, 1701 Graham Blvd., Apt. #3, Montréal, Québec, Canada, H3R 1G7

[21] Appl. No.: 984,688
[22] Filed: Dec. 2, 1992
[51] Int. Cl.⁶ .................. G01J 3/51; G01B 11/16
[52] U.S. Cl. .................. 356/419; 250/226; 250/227.18; 356/32; 356/45
[58] Field of Search ................. 356/32, 45, 408, 356/419; 250/227.18, 227.23, 226

[56] References Cited

U.S. PATENT DOCUMENTS 5,311,278  5/1994  Rosencher ................. 356/326
5,319,435  6/1994  Melle et al. ................. 356/32

Primary Examiner—Vincent P. McGraw

[57] ABSTRACT

The present invention discloses a method for demodulating, processing and multiplexing the signals from an array of structurally integrated Bragg grating laser sensors in an optoelectronic element in order that this sensing information can be transmitted from the structure by means of a single channel and a user friendly interconnect or free-space propagation. The invention also discloses a method for determining the wavelength of narrowband optical signals such as arises from Bragg grating laser sensors and includes, for each sensor, processing the optical signal through a spectral filter with a spectral transmission function that can be accurately translated by a control parameter which has been calibrated with respective to wavelength. The filtered signal is compared to the reference signal at different values of the control parameter to determine a value of the control parameter where a predetermined relationship of the spectrally filtered signal and the reference signal is achieved. This allows the wavelength to be determined. Apparatus for carrying out the method is also disclosed. A preferred embodiment involving the use of a multiple quantum well electroabsorption device to perform both spectral filtering and detection is also disclosed. The method and apparatus have particular application with lasers and laser sensing arrangements for smart structures.

17 Claims, 13 Drawing Sheets

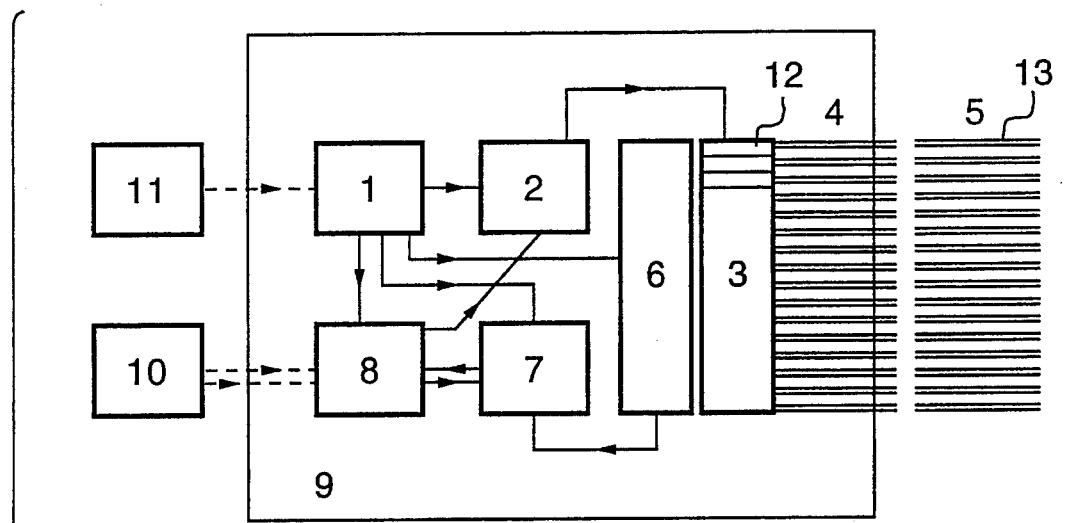

1- Power input port
2- Laser driver (Note possible flow of information from 8 to 2)
3- Laser diode array
4- Array of pigtailed single mode optical fibers
5- Array of fiber optic sensors (eg., intracore Bragg gratings)
6- Demodulator for fiber optic sensor array
7- Electronic signal processor and multiplexer (possible microcomputer)
8- Output/Input information port (e.g. electrical or optical interconnect)
9- Optoelectronic Smart Structure Interface Substrate
10- Receiving/Transmitting Port on support structure or other OSSI
11- Power Transmission Port on Support Structure
12- Laser diode tuned by a sensing Bragg grating
13- Intracore Bragg grating

FIG.2.

METHOD AND APPARATUS FOR AN OPTOELECTRONIC SMART STRUCTURE INTERFACE WITH WAVELENGTH DEMODULATION OF LASER SENSORS

FIELD OF THE INVENTION

The present invention relates to an "Optoelectronic Smart Structure Interface with Wavelength Demodulation of an Array of Laser Sensors", or OSSI for short. This OSSI invention uses an array of structurally integrated laser sensors {"laser sensor" describes the use of a "reflective sensor" in an optical waveguide to control the wavelength of a laser} to encode measurand information into the wavelength of the set of lasers. Passive or active wavelength demodulation converts the optical signals to electrical signals that are processed and multiplexed. The entire system comprises one or more optoelectronic/electronic elements, making possible a compact, low cost, user-friendly structural interface which simplifies the crucial interconnect problem for Smart Material and Structures. This OSSI invention also makes viable a "Sensing Cell Architecture" (SCA) which offers great flexibility in the design, configuration, structural integration and interconnection of built-in optical waveguide sensing system required for complex structural components and optical networking of information, not restricted to sensing data, within a complex structure such as an aircraft, where each OSSI could serve as a node of a sensing or communication network. Another advantage of a SCA is that it allows sensing system designs that would undergo graceful degradation in the event of damage to the structure. The OSSI invention can be seen to represent a significant advance toward the practical implementation of Smart Material and Structure technology.

BACKGROUND OF THE INVENTION

The practical implementation of Smart Material and Structure technology will be greatly facilitated by the present invention as it addresses a number of critical challenges facing this new field. We shall use the term Smart Material (or Smart Structure) to mean a material or structure having a resident fiber optic sensing system {optical fiber sensor will be used in a generic manner to mean any form of optical guided wave sensor} as part of the material or structure. This structurally integrated sensing system can be adhered to the surface of the material (or structure) or embedded within the material (or structure). The former situation is more often then not likely to arise for a metal, while the latter case is especially appropriate for: advanced composite materials, concrete, and in certain situations, cast metals.

These smart materials (or structures) could greatly improve the safety and economics of many industrial sectors: from aircraft to bridges, from space structures to submarines, from ships to pressure vessels. This structurally integrated sensing technology could also help protect the environment, first by warning of possible leaks or impending failure of containment vessels, and second by greatly reducing the need for inspections that require paint stripping of structures {like aircraft}. Structurally integrated sensing systems would also constitute a necessary component of any Smart Adaptive Structure controlled by an integrated actuation system.

The OSSI invention would constitute the heart of such structurally integrated sensing systems and represents a significant advance toward the practical implementation of Smart Material and Structure technology because it makes possible:

(i) A low cost, compact, robust, unobtrusive and nonperturbative interface which is capable of transmitting the sensing information from the structure through one of several user-friendly modes, including noncontact methods. To understand the significance of this advance it is necessary to appreciate that current approaches are based on conducting the raw optical signals from the optical fiber sensors out of the structure through a mechanical interconnect. This represents a major challenge for practical structures, such as wings of aircraft {which are subject to regular inspection, maintenance and repair, sometimes in harsh environments} because all fiber optic sensors deemed to be most appropriate for use with Smart Structures are based on single mode optical fibers and so very accurate and consistent alignment (of the order of a μm) will be required. By converting the raw optical signals to processed and multiplexed electronic signals within the OSSI we overcome these problems and can interconnect to the structure with either a single robust electrical cable {or single multimode optical fiber} or a noncontact free-space optical {or radio frequency} propagation technique. This latter technique becomes very important when the structure is inaccessible, isolated, or not convenient to require wire or optical fiber connections, and can be thought of as an "optical synapse."

(ii) A "sensing cell architecture" that offers great flexibility in design and configuration of the sensing system. This flexibility will be required if fiber optic sensing systems are to be structurally integrated within complex structural components, especially those fabricated from multilaminate advanced composite materials.

(iii) A low cost implementation of this technology when used in large numbers due to the possibility of automated manufacture of optoelectronic packages.

(iv) A high degree of damage tolerance for the sensing system that would permit graceful degradation of the sensing system in the event of damage to the structure.

(v) An adaptive neural network architecture in which each OSSI serves as a node and is connected to one or more other OSSI's of the same structure to form a self learning system that might also be self compensating or correcting.

An important embodiment of this OSSI invention is the development of several active wavelength demodulation systems for laser sensors that permit a large number of such demodulation systems to be built on a single monolithic optoelectronic substrate that would also be capable of undertaking both electronic signal processing and multiplexing. This leads to an optoelectronic interface is small and rugged enough to be integrated with almost any kind of structural component.

The present invention would find use in almost any kind of Smart Material (or structure) and would permit low cost implementation of this technology when used in large numbers due to the combination of several key functions onto a single optoelectronic substrate to form an interface that is compact and rugged enough to be integrated with the structure and the possibility of automated manufacture. These functions include: receiving external energy to power the system, interrogation of the sensing cell array of laser sensors, demodulation of the laser sensor signals, electronic processing and multiplexing of the sensing data into a single output channel, and transmission of this sensing data from the structure by means of a user friendly interface. The OSSI could be designed to use one or more output {communication} modes so that one system could be used in a variety of interconnect situations. These communication modes include: a single electrical (or optical) cable and a simple mechanical interconnect, or remotely through a noncontact approach based on free-space optical propagation. In the case of more isolated, or very large structures, like bridges, it may even be desirable to use radiowaves and this is also feasible with the OSSI. The nature of the input port of the OSSI would to some extent depend upon the output mode, the physical site and use of the structure. If the output data is transmitted as a free-space beam of optical radiation and avoidance of electrical cables is desirable, it would make sense for the input port to be designed to receive optical energy to power the OSSI.

This interconnect freedom and the combination of functions undertaken by the OSSI would permit a "sensing cell architecture" that would provide considerable flexibility in the sensing configuration, allowing a comprehensive sensing system to be integrated into structures of complex multilaminate shape with differing sensor density and configuration requirements in different regions of the structure. Another important feature of this OSSI invention is that it makes possible the development of a structurally integrated information processing network for handling the enormous flow of complex signals that would arise from a large number of sensing cells. This processing network could be used to reduce this data to a more meaningful flow of highly relevant information. In this architecture each OSSI might serve as a neuron in a neural network, each with its attendant set of sensing optical nerves. This might allow considerable signal reduction and interpretation within the adaptive network. An information network based on OSSI's need not restrict its use to transmitting and processing of sensing information collected by the attendant sensing system, it could also serve as a communication network for other information. For example, in a future fly-by-light aircraft, a structurally integrated OSSI based optical sensing network might double as a communication system for the optical flight control signals.

SUMMARY OF THE INVENTION

The present invention relates to a method and an arrangement for undertaking structural sensing for Smart Materials or Structures by means of an "optoelectronic smart structure interface" (OSSI). The term optical fiber will be used for the sake of brevity, however, this invention could equally apply to other forms of optical guided wave systems such as planar optical waveguides.

The OSSI invention performs the following primary functions: it interrogates its attendant sensing cell array of fiber optic sensors; it demodulates the optically encoded sensing signals; it processes the resulting electrical signals and multiplexes them so that they are available on a reduced number {most often one} of channels compared to the number of sensors; and it transmits this multiplexed signal either from the structure or to another OSSI of the structure. An important aspect of the OSSI is that the sensing data is transmitted out from the structure either remotely and in a noncontact method via a free-space optical beam, or through a single electrical (or optical) cable and a simple robust interconnect. These output modes make the OSSI extremely user friendly and avoids the major difficulty facing the more conventional approach of transmitting the direct optical sensing data by means of a many single mode optical fibers in the form of a ribbon or bundle. This latter form of interconnect would face many problems (especially if a large number of sensors, 20 or more, were involved) in practical situations, where there could be high levels of vibration, unskilled mechanical handling, wide temperature excursions and a dirty environment. In addition, the "sensing cell architecture" made possible by the OSSI, would allow a damage tolerant sensing system to be installed in structures with complex geometries and layups. Power for the OSSI can be provided in a number of ways: a small, long life battery mounted in the structure; through the electrical cable, or by means of optical energy which would be converted to electrical power. This optical power could be supplied by an optical fiber or a free propagating beam, or by a solar cell array.

One of the preferred embodiments in this invention relies on the use of an array of structurally integrated laser sensors to encode measurand information into the wavelength of the set of lasers and a new form of active wavelength demodulation which permits miniaturization of the system, even in the case of a large array of sensors. This method of wavelength demodulation permits many such systems to be integrated onto a single monolithic optoelectronic substrate {or a set of discrete interconnected optoelectronic/electronic modules} forming a compact and rugged structural interface. Each laser sensor comprises either a semiconductor or fiber laser which uses a strain or temperature tuned (i.e., sensing) intracore fiber Bragg grating as a narrowband reflector for the laser. It is also possible to use several such Bragg gratings with one laser. The laser can be excited to lase at several wavelengths, each determined by a different Bragg grating—or time multiplexing can be used to switch between gratings In essence, the Bragg grating sensor encodes the strain {or temperature} it experiences into the wavelength of its respective laser. The laser wavelength is determined by making two measurements of the laser radiation, at least one of which is spectrally dependent, the other providing a reference to compensate for: source power variations, micro- and macrobend losses, and misalignment of components. Direct measurement of this signal ratio can be used to ascertain the laser wavelength in a passive manner as demonstrated and claimed in our earlier patent application, Ser. No. 07/754,641, filed Sep. 4, 1991 [Melle et al.] now U.S. Pat. No. 5,319,435. This technique involves a trade off between measurand resolution and range. To extend the measurand range with no loss of measurand resolution some form of "active" wavelength demodulation is necessary. Active wavelength demodulation can be performed in several ways but each requires that the spectral filter function be wavelength translated by means of a suitable control signal applied to the filter. In this way the laser wavelength to be measured can be made to fall within the steep, linear portion of the spectral filter function.

One method involves locking the ratio of the filtered and reference signals to some optimum value by making the spectral filter function track the laser wavelength. This is accomplished by constantly adjusting the control signal applied to the filter. The control signal used in this feedback loop can be used to infer the sensing signal.

Alternatively, the spectral filter function can be scanned so that its wavelength dependent (linear) region traverses the entire potential range of the laser wavelength and the voltage required to reach a given signal in each sweep {compared to the reference signal from the other detector} used to determine the laser wavelength.

A considerable simplification in design is possible if the spectral filter function is performed by the spectral response function of the detector, as described in "High-speed and low-driving-voltage InGaAs/InAlAs as multiquantum well optical modulators", Electronics Letters, Vol. 27, No. 23 (1991): pp 2162–3. This is possible using an electroabsorption (EA) device as a detector. The spectral response (absorption edge) of these devices may be wavelength translated by application of an appropriate voltage. Multiple quantum well (MQW) EA devices have particularly good characteristics in this regard due to the quantum confined Stark effect. It is also possible that the Franz-Keldysh effect in bulk semiconductor devices could be used as an alternative to the MQW EA devices, although the latter is likely to give superior performance. In the MQW EA device embodiment the two measurements are made with two detectors where at least one acts as both filter and detector. In the tracking approach the reverse bias voltage applied to the MQW EA detector to lock the ratio of the filtered and reference signals is used to determine the laser wavelength and from that the measurand.

These MQW EA devices can also be used in the scanning approach discussed above. In this instance the spectral response function is scanned and the bias voltage required to reach a given detected signal level in each sweep {compared to a reference level} is used to determine the laser wavelength.

A significant simplification in the architecture is possible by using a single detector and one filter in either the tracking or scanning approaches previously described. In order to be able to make the two measurements, needed to compensate for intensity variations of the laser optical signal, the detector must be switched between two modes: a scanning or tracking mode {depending on the technique being employed} and a reference mode where the laser wavelength falls in a wavelength independent part of the spectral transmission function of the filter. The ratio of signals to be used in either case now originates from the same detector. This eliminates drifts and changes between two detectors as well as greatly simplifying the optical architecture.

The greatest simplification arises when a single MQW EA detector is used in the manner where its spectral response serves as the spectral filter function. Here again the detector must be switched between two modes: a scanning or tracking mode {depending on the technique being employed} and a reference mode where the laser wavelength falls in a wavelength independent part of the spectral response function of the detector. The ratio of signals to be used in either case now originates from the same detector. This eliminates drifts and changes between two detectors as well as greatly simplifying the optical architecture.

Although the preferred embodiment discussed above relies on Bragg grating based laser sensors, the OSSI invention could also be achieved with other types of fiber optic sensor such as the Fabry-Perot sensor. In this instance the measurand induced phase change experienced by each sensor is determined by means of a single detector and an electronic demodulation system after some fraction of the backreflected optical signal is directed into the detector. Sampling of the backreflected optical signal may be achieved by means of a direction coupler on the output optical fiber or it could be accomplished through integrated optics. One of the complicating factors for this form of OSSI is that each laser has to be protected from the backreflected signal by means of an isolator. This complicates the architecture and method of fabrication and is likely to limit the miniaturization possible.

BRIEF DESCRIPTION OF THE DRAWINGS

FIG. 2 is a generic diagram indicating the major elements of the OSSI. In this preferred embodiment of the OSSI, the semiconductor laser diodes and the intracore Bragg grating sensors are specifically indicated;

DETAILED DESCRIPTION OF THE PREFERRED EMBODIMENTS

The present invention will be described with respect to optical fibers, however, it can be appreciated that the Bragg grating can be formed in other optical waveguides such as integrated optics or planar thin films. Thus Bragg gratings can be provided within different optical waveguides and the exact form of the waveguide is not critical. With this system, the wavelength of the laser is controlled by the measurand of interest through a narrowband reflective sensor in an optical waveguide. This is generally referred to as a "laser sensor".

Figure 1:
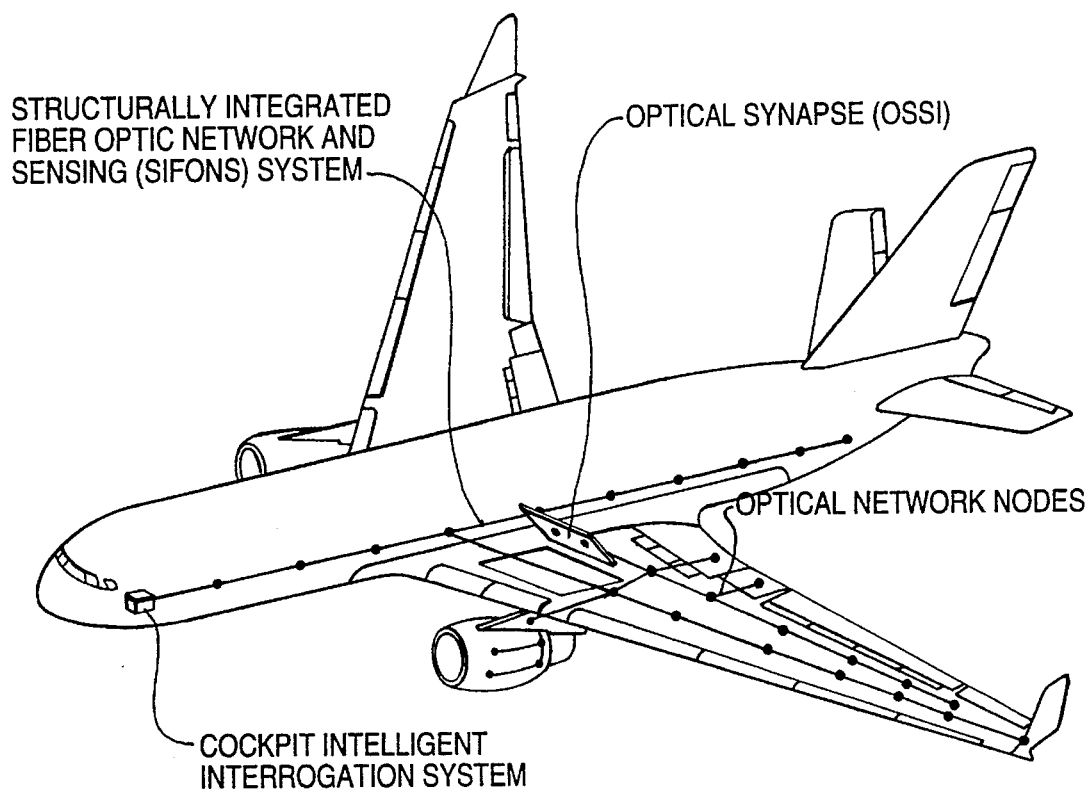
FIG. 1 is an illustration of the use of the OSSI invention in regard to a structurally integrated fiber optic network and sensing (SIFONS) system for an aircraft.
Figure 1A:
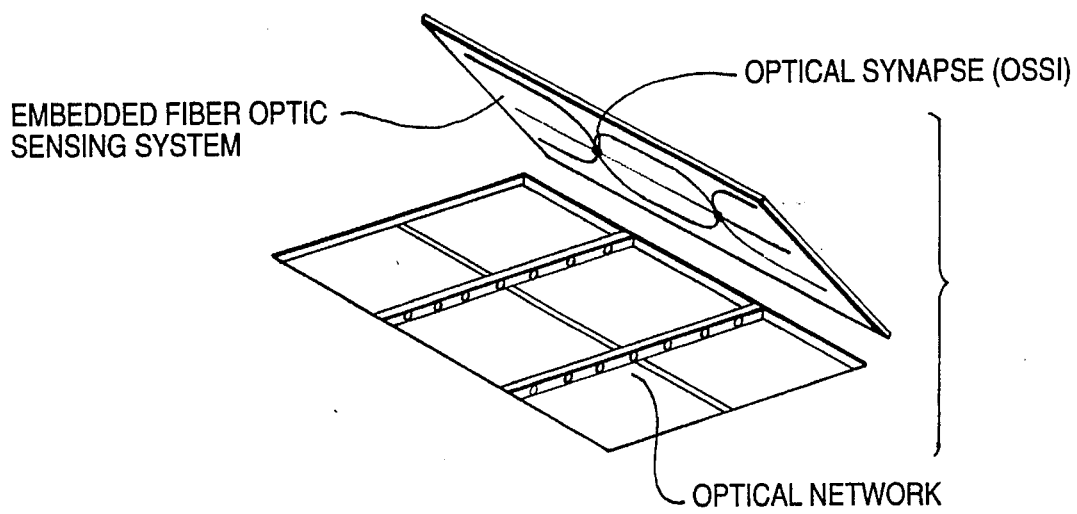
FIG. 1A illustrates the use of the Optical Synapses and structurally integrated fiber optic sensing network of one structural component of FIG. 1.

An illustration of the use of the OSSI invention in regard to a structurally integrated fiber optic network and sensing (SIFONS) system is presented in FIG. 1. A generic overview of the OSSI is presented in FIG. 2. An input power port 1, enables external energy to provide electrical power for the OSSI directly through a conventional electrical cable, or by means of electromagnetic induction or a battery, or by means of an optoelectrical converter for either free-space optical power reception or optical power delivered through an optical fiber. A laser driver 2 excites the array of lasers 3, each laser being pigtailed to {or part of} the lead in/out optical fiber 4, to a fiber optic sensor 5. In this embodiment the sensor is in the form of a narrowband tunable reflector which encodes the strain for temperature) it experiences into the wavelength of the laser. Hill et al., 1978; Dunphy et al., 1990; Ball and Morey 1992; S. Melle, T. Coroy, S. Karr, T. Alavie and R. Measures, "Structural Sensing Using a Fiber Laser Strain Sensor", OE/Fibers 92, Fiberoptic Smart Structures and Skins Conference, Boston, September 1992; and T. Alavie, A. Orthanos, S. Melle, K. Lui and R. Measures, "Bragg Fiber Laser Sensor", OE/Fibers 92, Fiberoptic Smart Structures and Skins Conference, Boston, September 1992, have demonstrated the concept of laser tuning with strain or temperature controlled Bragg gratings. The measurand controlled laser wavelength is determined by making two measurements of the laser radiation, at least one of which is spectrally dependent, the other acts as a reference to compensate for: source power variations; micro- and macrobend losses, and misalignment of components. Direct measurement of this ratio can be used to ascertain the laser wavelength in a passive manner as demonstrated and claimed in our earlier U.S. patent application Ser. No. 07/754,641 filed Sep. 4, 1991 [Melle et al.] incorporated herein by reference.

With the passive technique used in our earlier patent there is a trade off between the measurand resolution and the measurement range of the system. Steepening the slope of the spectral filter function increases the sensitivity but reduces the measurand operating range. To extend the measurand range with no loss of measurand resolution some form of active wavelength demodulation is necessary. Active wavelength demodulation can be performed in several ways but each requires that the spectral filter function can be wavelength translated by means of a control signal applied to the filter. By this means the laser wavelength, to be measured, can be made to fall within the steep, linear portion of this spectral filter function.

In one approach active wavelength demodulation (AWD) is achieved by locking the ratio of these signals to some optimum value by means of feedback control of the spectral filter function used for the wavelength dependent measurement. The tracking voltage used in this feedback loop then serves to provide the sensing signal. Alternatively, the spectral filter function can be scanned and the voltage required to reach a given signal in each sweep {compared to a reference signal} provides the sensing signal. The measurand controlled laser wavelength information from each laser sensor is electronically processed and multiplexed {with the measurand information from all the laser sensors} 7, before being sent to the output/input information port 8, that transmits the sensing data either in the form of a free-space optical beam for remote, noncontact, reception on some other structure or at another point on the same structure, or as electronic (or optical) signals within an electrical (or optical) output cable from the structure by means of a simple, robust interconnect. Where the OSSI also receives information, as it would do if part of a communication or sensing network or a node of a neural network, instructions or information could flow from the output/input information port 8, to the laser driver 2, and or the electronic processor 7. The entire OSSI system is packaged on a single optoelectronic substrate 9, {or as a set of discrete interconnected optoelectronic and electronic modules} making it very compact and robust and suitable for integrating with the structure {surface mounted or embedded} to be instrumented. The receiving/transmitting port 10, serves as an information link between this OSSI and the support structure, or another OSSI. The power distributed to components: 2,6,7, and 8, from the input power port 1, is received from the external source 11 mounted on some support structure or another part of the same structure. In certain cases the power could be supplied from solar cells or a battery or by magnetic induction.

Figure 3A:
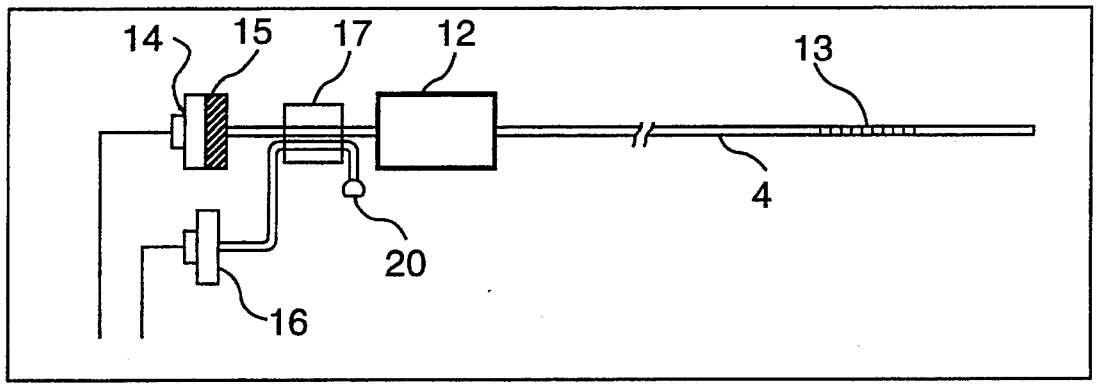
FIG. 3 presents three possible arrangements (A,B,C) for sampling the laser output with two detectors. In each case a wavelength dependent filter is used in conjunction with at least one of the detectors, the other serving as a reference.
Figure 3B:
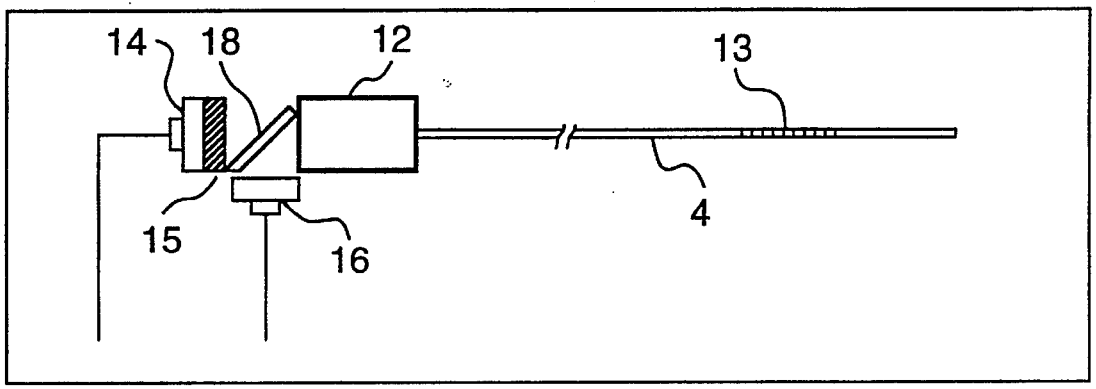
Figure 3C:
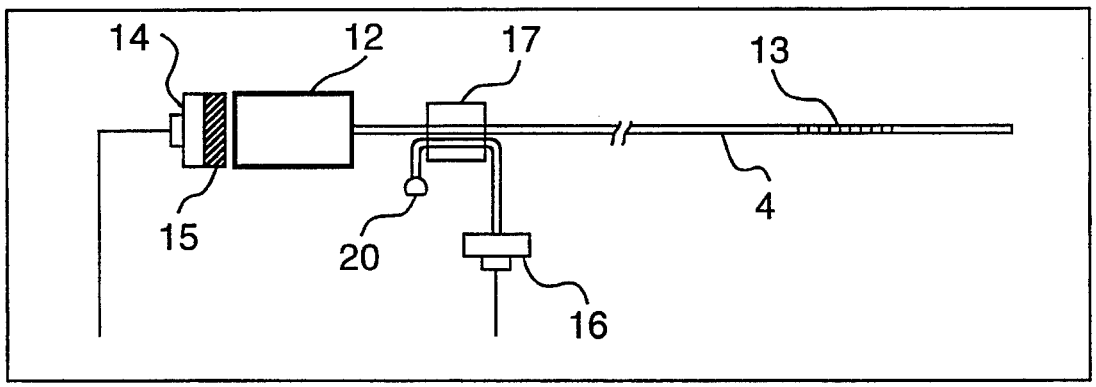

In this preferred embodiment, shown in FIG. 2, each semiconductor laser diode 12, in the laser array 3, has its operating wavelength controlled by a narrowband reflective sensor in the form of an intracore Bragg grating 13, that is formed in the optical fiber 4 that is pigtailed to the laser, or connected via an integrated optic circuit. The wavelength of each laser sensor is encoded by the strain {or temperature} experienced by its intracore Bragg grating. The corresponding laser wavelength is measured either by a passive wavelength demodulation as described in our earlier patent application, Ser. No. 07/754,641 filed Sep. 4, 1991 (Melle et al.), or by an active wavelength demodulation system. In a preferred embodiment of the latter approach, the laser output is sampled by two detectors. Three possible sampling arrangements involving two detectors are presented in FIG. 3. The optical signal is detected in at least one detector 14, after passing through a wavelength dependent filter 15. Note that although it is desirable to have a transmission function that is linearly dependent on wavelength, it is not necessary for active wavelength demodulation. The other detector 16, serves as a reference to take account of any changes in the intensity of the optical signal due to the variations in the strength of source, time changing losses such as might arise from macro- and microbends in the optical fiber or misalignment problems, by either having no filter or one with a different spectral response. Arrangement (A) in FIG. 3 involves a waveguide coupler {integrated optics would lead to a much more compact and robust system than one involving a fiber optic coupler} 17. Note, a nonreflective terminator 20 is used in conjunction with the waveguide coupler. Arrangement (B) relies on a microoptic beam splitter 18 to accomplish the division of the optical signal. It is also possible to simply wavefront divide the laser output or tap some fraction of the laser output to the sensor. One example of the latter approach, also based on the use of a waveguide coupler 17, is presented as arrangement (C) of FIG. 3. However, this latter arrangement is not as desirable as it introduces a loss mechanism within the laser cavity, i.e., the region between the gain medium {the laser diode} and the external tuning mirror (the Bragg grating sensor in the preferred embodiment).

Figure 4:
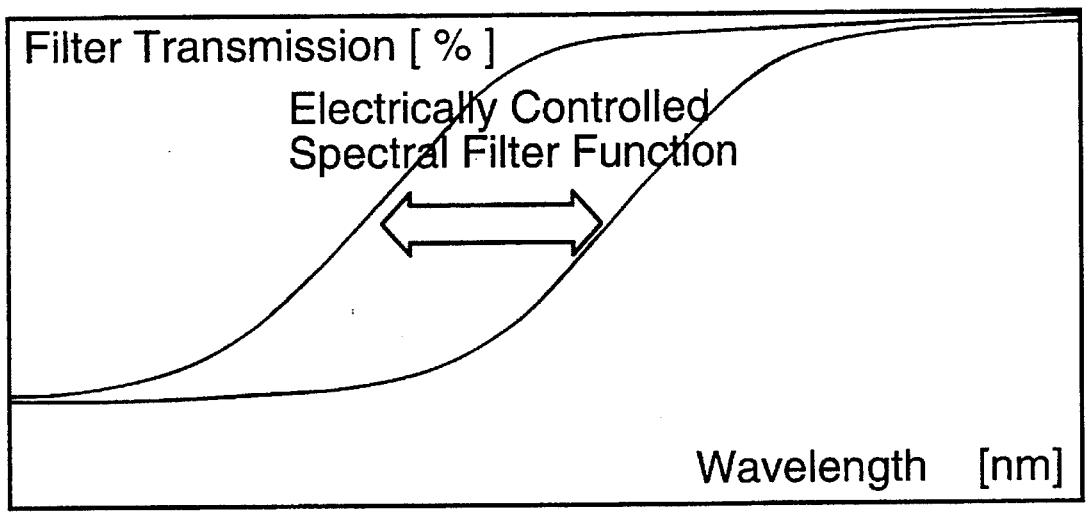
FIG. 4 is a graph indicating how the electrically controlled spectral filter function is used to track the laser wavelength in the active wavelength demodulation approach.
Figure 5:
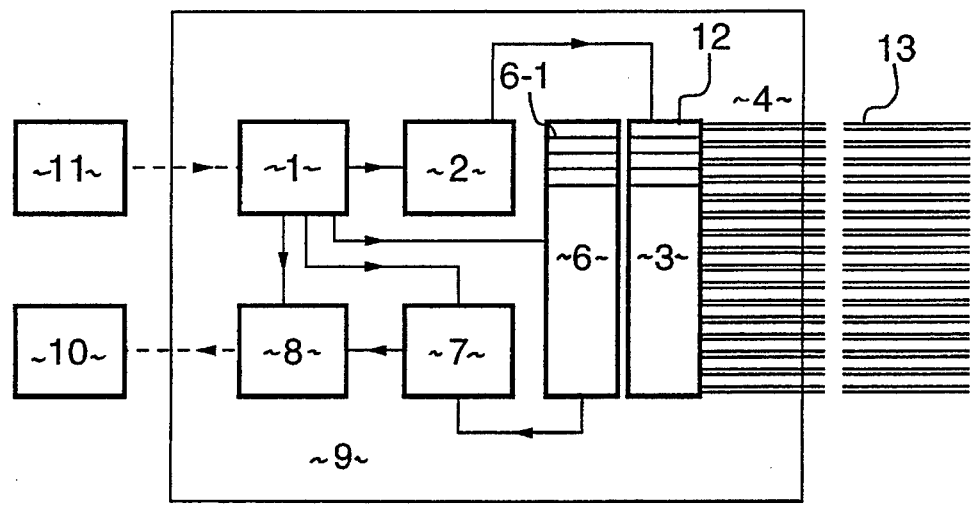
FIG. 5 illustrates the OSSI with the laser wavelength demodulation elements identified and FIG. 5A illustrates the major components of the active wavelength demodulation system for the Bragg laser sensor based on the arrangement using a waveguide coupler and a voltage feedback loop to wavelength translate the spectral filter function in order to track or scan the laser wavelength.
Figure 5A:
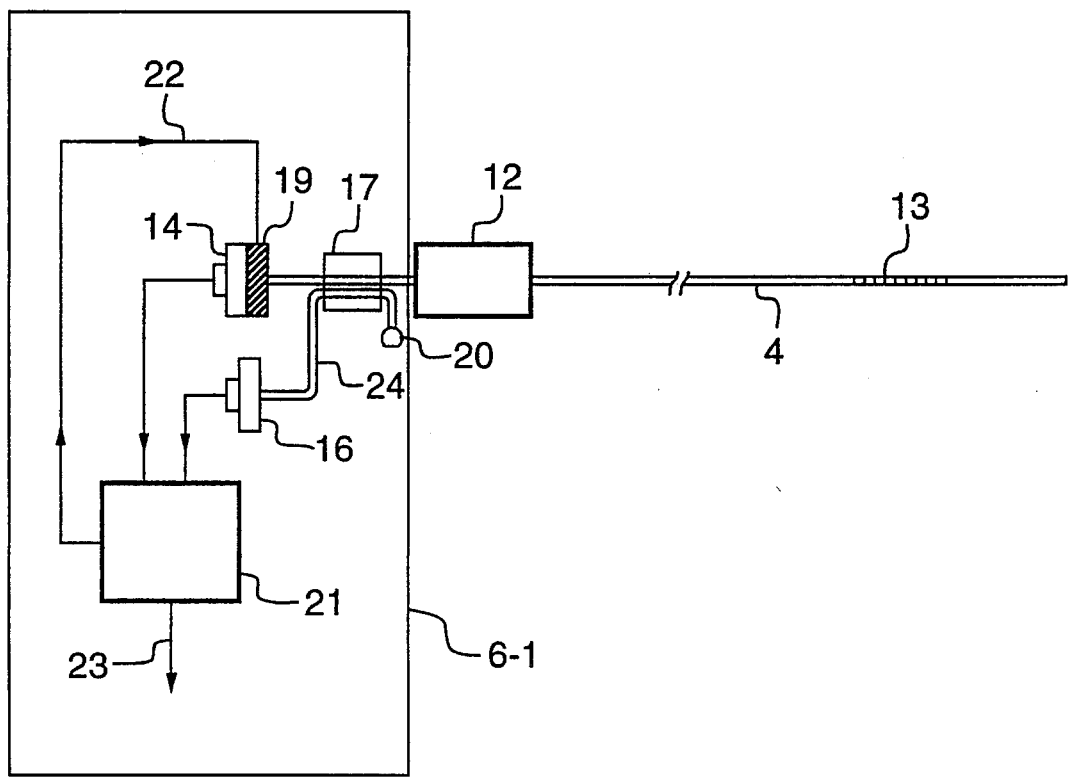

The ratio of these two signals can be used directly to ascertain the laser wavelength, but as indicated above this passive approach leads to a compromise between measurement range and measurand resolution. This limitation can be overcome with active wavelength demodulation. One embodiment locks the ratio of signals to some optimum value by wavelength translating the spectral filter function through application of an appropriate bias voltage, see FIG. 4, supplied by the feedback controller 21, to an electronically controlled filter 19, FIG. 5A. The tracking signal 22 used to spectrally control the spectral filter function then serves to provide the sensing output signal 23. This form of active wavelength demodulation is illustrated for the (A) arrangement of FIG. 3 in FIG. 5. However, it could equally be applied to any of the arrangements shown in FIG. 3. In general the active wavelength demodulation system for each laser 6-1, is indicated in FIG. 5 and the specific form presented is shown in FIG. 5A. Active wavelength demodulation can also be achieved by repeatedly wavelength scanning the spectral filter function and recording the voltage required to reach a given signal level {compared to the reference signal from the second detector} in each sweep. This measurement is then related to the sensing signal.

Wavelength translating the spectral filter function can be undertaken in a number of ways, for example the transmission profile of a Bragg grating can be thermally or strain (piezoelectrically) tuned; a Fabry-Perot filter can also be pressure or piezoelectrically tuned, acoustooptic and Ti:LiNbO3 modulators can be electrically tuned. However, electroabsorption (EA) is the preferred embodiment as this offers the prospect of: very fast modulation (GHz); sweeping the absorption spectrum over a wavelength interval (~100 nm in InGaAs/InAlAs) commensurate with the desired measurement range; and direct integration into the OSSI optoelectronic substrate. EA devices are made of semiconductor materials which would permit them to be fabricated in a monolithic (single substrate material) optoelectronic integrated circuits (OEIC). This has several long-term advantages when compared with hybrid OEIC's (which incorporate various substrate materials). Monolithic OEIC's are likely to be far cheaper in mass production, since automated batch processing may be used, and they are less susceptible to damage from vibration and thermal expansion. A further explanation of this is found in R. G. Hunsperger, Integrated Optics: Theory and Technology, 3rd ed., Springer-Verlag, Berlin, 1991: p.9. By comparison lithium niobate is a passive material, incapable of light generation, therefore the use of a lithium niobate based filter would lead to a hybrid OIC. An EA device, used as an optical modulator, has been reported in InGaAs/InAlAs demonstrating a wavelength shift of approximately 100 nm in photocurrent spectrum for an applied reverse bias of 4 V (with extremely low spectrum edge deformation), which is discussed in "Highspeed and low-driving-voltage InGaAs/InAlAs as multiquantum well optical modulators", Electronics Letters, Vol. 27, No. 23 (1991): pp 2162–3. The device operated at 1.55 $\mu$m with a 16 GHz bandwidth (and a 1.5 V 10 dB on/off ratio). EA modulators have also been manufactured for 1.5. $\mu$m in InGaAs/InP, demonstrating optical bandwidths as high as 18 GHz, but the spectral characteristics of these devices are uncertain, as discussed in "Design and fabrication of InGaAsP/InP waveguide modulators for microwave applications:, Proc. SPIE conference on Microwave, Optical, and Phased Array Radar Processing, (Apr. 22, 1992), Orlando, Fla.), Vol. 1703.

An improved embodiment uses a single Multiple Quantum Well Electroabsorption (MQW EA) device as both a detector and a filter, combining the spectral filtering and detection functions in one device. In these MQW EA devices an electron current is obtained when light is absorbed within the guided wave absorption section of the device. Furthermore, the spectral absorption function can be wavelength translated with a small drive voltage and at very high speed permitting switching bandwidths in the GHz range. The resulting system simplification is particularly important in integrated optics applications, for it makes possible the most compact design and simplest architecture. A particular point to note is that the MQW EA device can probably be fabricated on the same monolithic substrate as the laser and this is an important advantage from the standpoint of manufacturing cost, compactness and ruggedness. In this embodiment active wavelength demodulation is achieved through either the signal ratio lock-in feedback spectral control scheme or the spectral scanning scheme discussed above, wherein the spectral position of the (MQW EA) detector absorption or response spectrum is spectrally translated by adjustment of the applied bias voltage.

Figure 6:
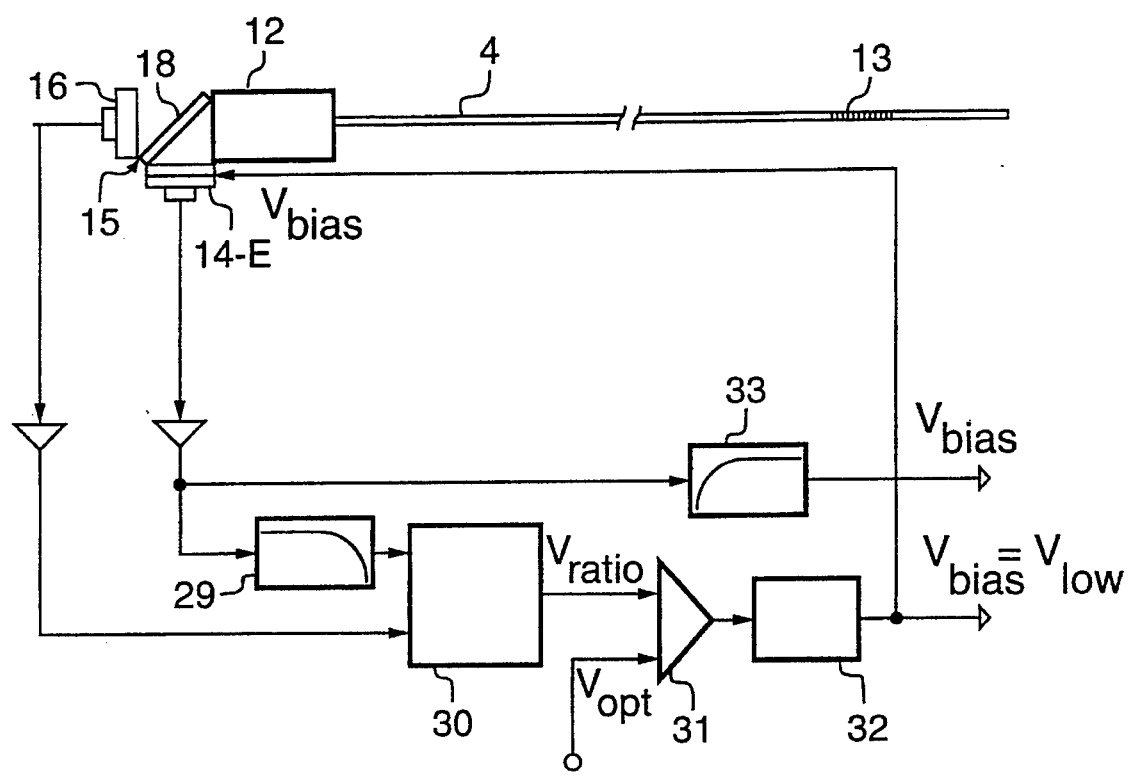
FIG. 6 illustrates the major components of the active wavelength demodulation system based on using two detectors, one of which is an MQW EA device, with a reverse bias voltage controlled spectral response function. This bias voltage is provided by a controller and is determined by the error voltage between the instantaneous spectrally filtered to unfiltered detector signal ratio and some optimum value. High bandpass filtering of the direct MQW EA device output provides the high frequency wavelength variation.
Figure 7:
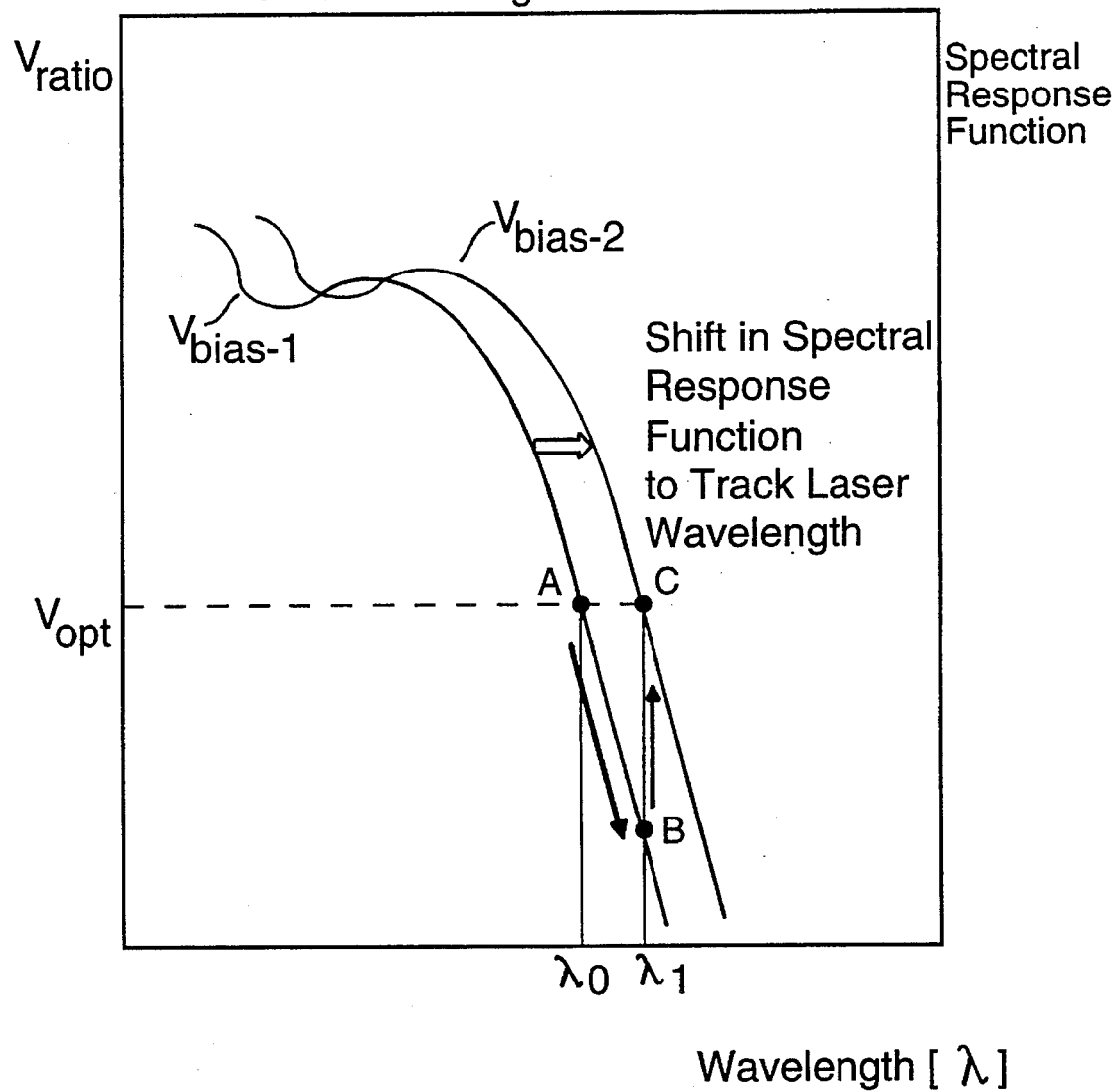
FIG. 7 illustrates the principle of active wavelength demodulation based on forcing the spectral response function of the MQW EA device to track the laser wavelength by feedback control of its reverse bias voltage.

FIG. 6 shows a representative system diagram for a two-detector wavelength tracking AWD system for a Bragg grating laser sensor. In this arrangement the portion of laser radiation transmitted through the rear reflective surface of the lasing cavity is divided and one part sent to a regular detector, while the other part goes to a MQW EA device, 14-E, of FIG. 6. Some fraction of the MQW EA device signal is low-pass filtered, while the remainder is high-pass filtered and used to monitor the very high frequency wavelength encoded signals. The low-pass spectrally filtered signal is then divided by the spectrally unfiltered signal (which in most cases would also be low-pass filtered although not shown in FIG. 6) from the other detector to produce, $V_{ratio}$. FIG. 7, shows a typical spectral response curve for an MQW EA device after intensity self referencing 29 ($V_{ratio}$ in FIG. 6) and details the manner in which the system operates. At point A, the system is "locked" onto the incoming laser wavelength, $\lambda_0$ and $V_{ratio}$ equals $V_{opt}$. If the Bragg laser sensor radiation shifts to a longer wavelength, $\lambda_1$, the self referenced signal, $V_{ratio}$, will drop to a value corresponding to point B, which is below $V_{opt}$. The error signal [$V_{error}=V_{ratio}-V_{opt}$] 31, is then fed to the controller 32, which produces a signal $V_{bias}$ that is used to wavelength shift the spectral response function of the MQW EA device, until $V_{ratio}$ again equals $V_{opt}$. The system, in effect, moves to point C, in FIG. 7, where it is once more at equilibrium, "locked" onto the incoming wavelength. The change in the bias voltage required to reach this new equilibrium serves as the low frequency below 1–10 MHz) sensing signal, $V_{low}$.

If the incoming laser wavelength signal has a frequency component that is higher than the AWD electronics can "lock on" to, the low frequency component will be used in the feedback control loop to "track" the laser wavelength; while the high frequency wavelength component (with generally a smaller amplitude) provides a high frequency signal, $V_{high}$, as its wavelength varies along the edge region of the spectral response function (see FIG. 7) and gives rise to the time varying signal that is high bandpass filtered, 33. The Bragg laser wavelength, $\lambda_B$, will thus be given by the expression:

$$\lambda_B = \Delta\lambda_{low} + \Delta\lambda_{high} + \lambda_0 = K_{low}V_{low} + K_{high}V_{high} + \lambda_0$$

where $\Delta\lambda_{low}$ and $\Delta\lambda_{high}$ are the low and high frequency wavelength components corresponding to the measured signals, $V_{low}$, and $V_{high}$. $K_{low}$, $K_{high}$ and $\lambda_0$ are system constants. It should be noted that the assumption has been made that the spectral response shift of the MQW EA device is linear with applied voltage in the case of $\Delta\lambda_{low}$, and that the slope of the spectral response (of the absorption edge) does not change appreciably as the spectral response function is translated (in the case of $\Delta\lambda_{high}$). These are simplifying assumptions which may be taken as approximately valid over certain operating ranges, depending on the design of the MQW EA device used.

The sensing data is then electronically processed and multiplexed in element 7, of FIG. 2 before being sent to the output device 8, that transmits the sensing data either in the form of an encoded free-space optical beam for remote, noncontact reception or as electronic (or optical) signals within a single output electrical (or optical) cable and a simple, robust interconnect. The entire OSSI system is packaged on a single optoelectronic substrate 9, {or as a set of discrete interconnected optoelectronic and electronic modules} making it very compact and robust and suitable for integrating with the structure {surface mounted or embedded}. The receiving/transmitting port 10, serves as an information link between this OSSI and the support structure, or another OSSI. The power distributed to components: 2,6,7, and 8, from the input power port 1, is received from the external source 11 mounted on some support structure or from batteries or solar cell mounted on the same structure. In another embodiment of the OSSI the output sensing data is transmitted in the form of radio waves. This might be suitable for isolated structures, like bridges, or inaccessible locations. It should also be noted that where the OSSI is to be used as a node of an optical sensing or communication network, information signals can be communicated from 8 to 2.

Figure 8:
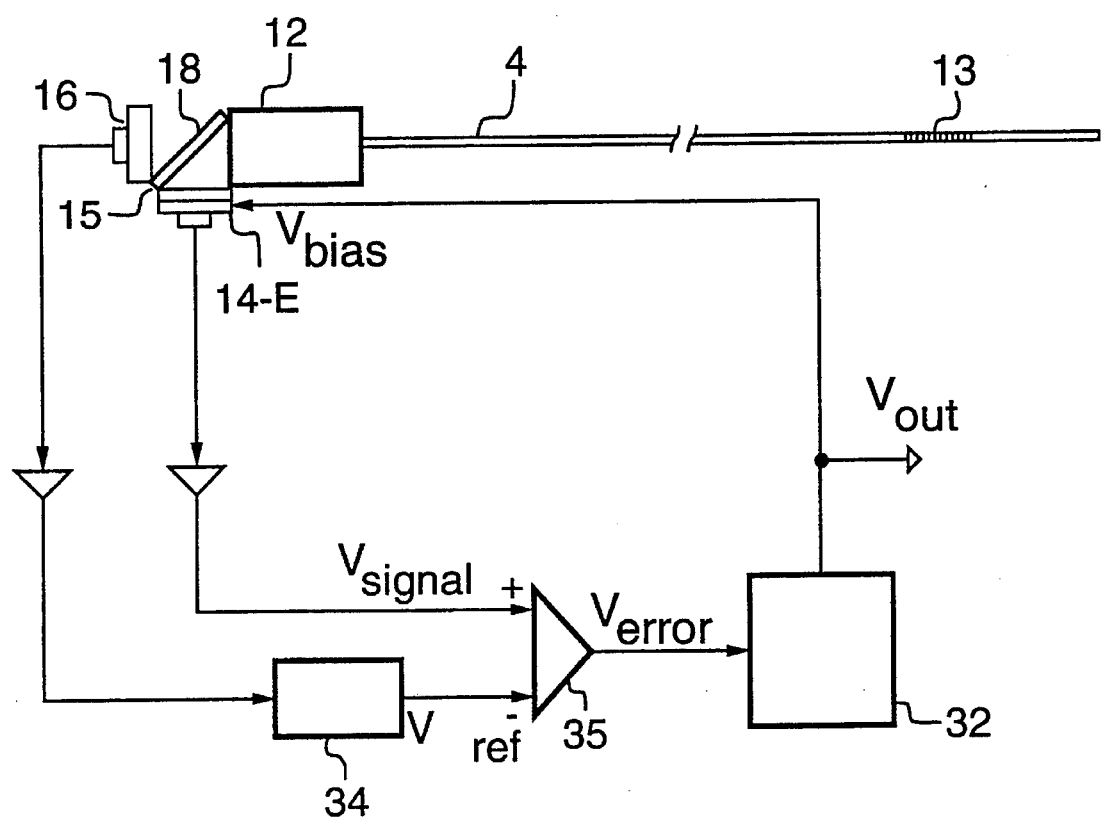
FIG. 8 illustrates the major components of the active wavelength demodulation system based on two detectors, one of which is an MQW EA device with a reverse bias voltage controlled spectral response function, where no division of the signals is required. As with FIG. 6 the bias voltage is provided by a controller, but in this case the error voltage arises from the difference between the instantaneous spectrally filtered detector signal and some optimum value of the unfiltered detector signal.

An alternate embodiment for active wavelength demodulation that does not require division of the two detected signals, is indicated in FIG. 8, and involves using the signal from the spectrally unfiltered detector 16, to provide a reference for the controller 32, of the spectral response function. In this approach the spectrally filtered signal, $V_{signal}$, which depends on both the intensity and the wavelength of the laser, is used as the feedback signal to the controller 32. The spectrally unfiltered signal, reduced in some fixed proportion 34, serves as the reference signal $V_{ref}$. When compared with the spectrally filtered signal, $V_{signal}$, in 35, an error signal $V_{error}$ is generated for the MQW EA device controller 32. The spectral filter function is then wavelength shifted, by means of signal $V_{bias}$ from the controller 32, so as to maintain a fixed ratio between the filtered and unfiltered signals. The control signal to the filter can also be used to provide an absolute determination of the laser wavelength, which is related to the sensing signal.

Figure 9:
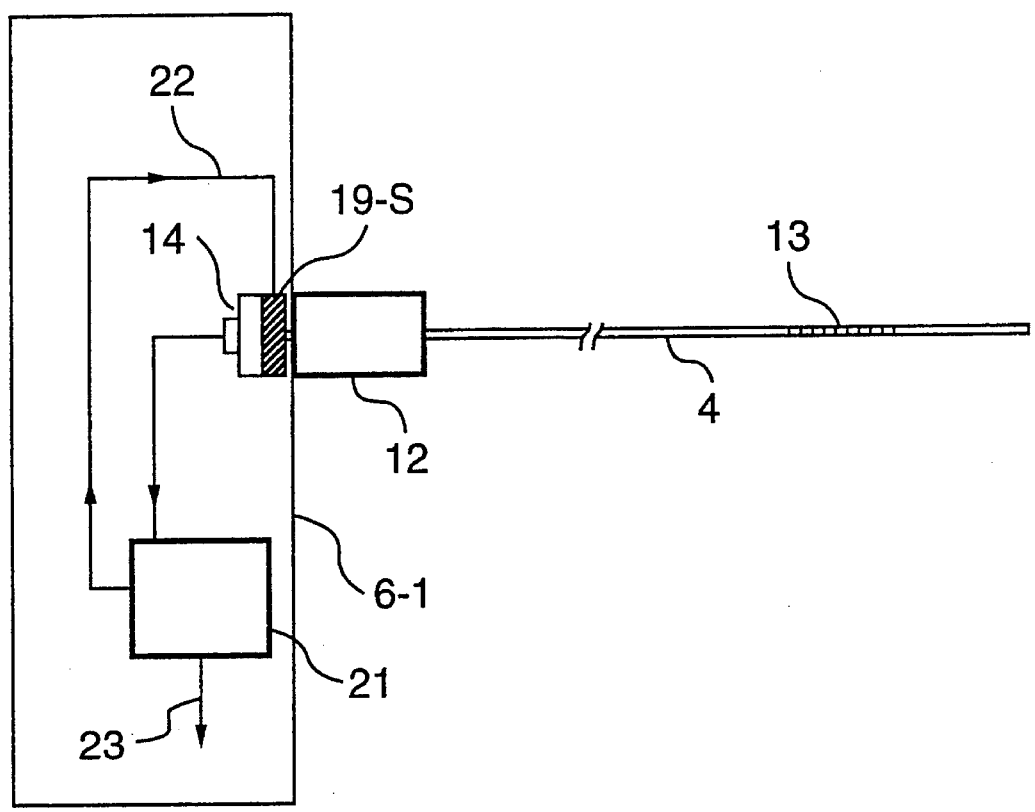
FIG. 9 illustrates the major components of the active wavelength demodulation system based on using the combination of a single detector and a voltage controlled wavelength dependent filter. In this approach the spectral filter function is rapidly switched between a reference state and a dynamic state that is spectrally translated to keep the ratio of successive detected signals the same. An output of the system of FIG. 9 is shown in FIG. 9A.
Figure 9A:
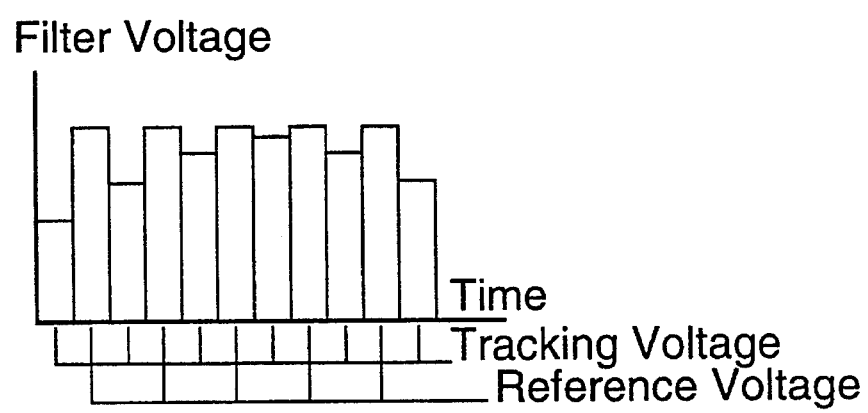
Figure 10:
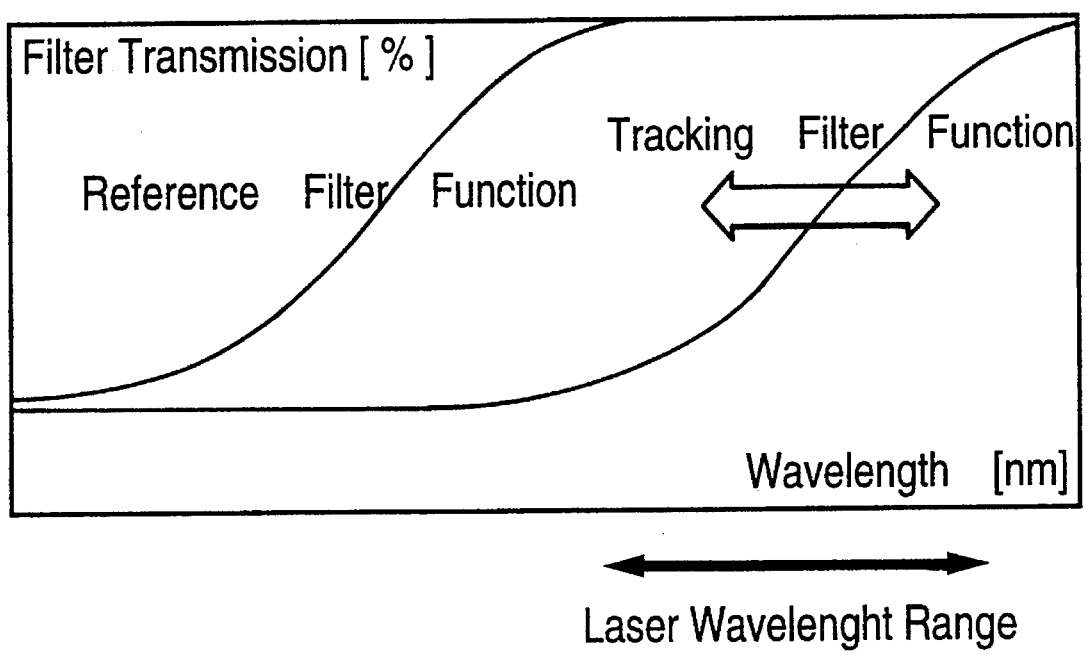
FIG. 10 shows the two spectral filter function states. One of these functions is the same in each alternate time interval and serves as a reference, and the other function is spectrally translated to keep the ratio of successive detected signals the same, thereby tracking the laser wavelength.

A significant simplification in the OSSI architecture results when the filter function can be spectrally translated at a rate much faster than any time of interest {i.e., times in which the strain field can change}. Under these circumstances a "single" detector is used with each laser sensor and the spectral filter function of its filter is alternately switched between the reference {voltage} spectral filter function and the tracking or scanning {voltage} spectral filter function. A very attractive feature of this approach is that potential variations and drifts between detectors is eliminated and the spectrally switched filter 19-s of FIG. 9 and photodiode are backed right up against the laser removing the need for any method of splitting the laser signal, allowing a very compact design and simple architecture as shown in FIG. 9. Note this embodiment works best when the reference spectral filter function is flat {i.e., independent of wavelength} over the potential laser wavelength range of interest, see FIG. 10. The single detector approach can also be used with the scanned spectral filter function, wherein the bias voltage required to reach a given signal level in each sweep {compared to the reference signal from the same detector in this case} is used as the sensing signal.

Figure 11:
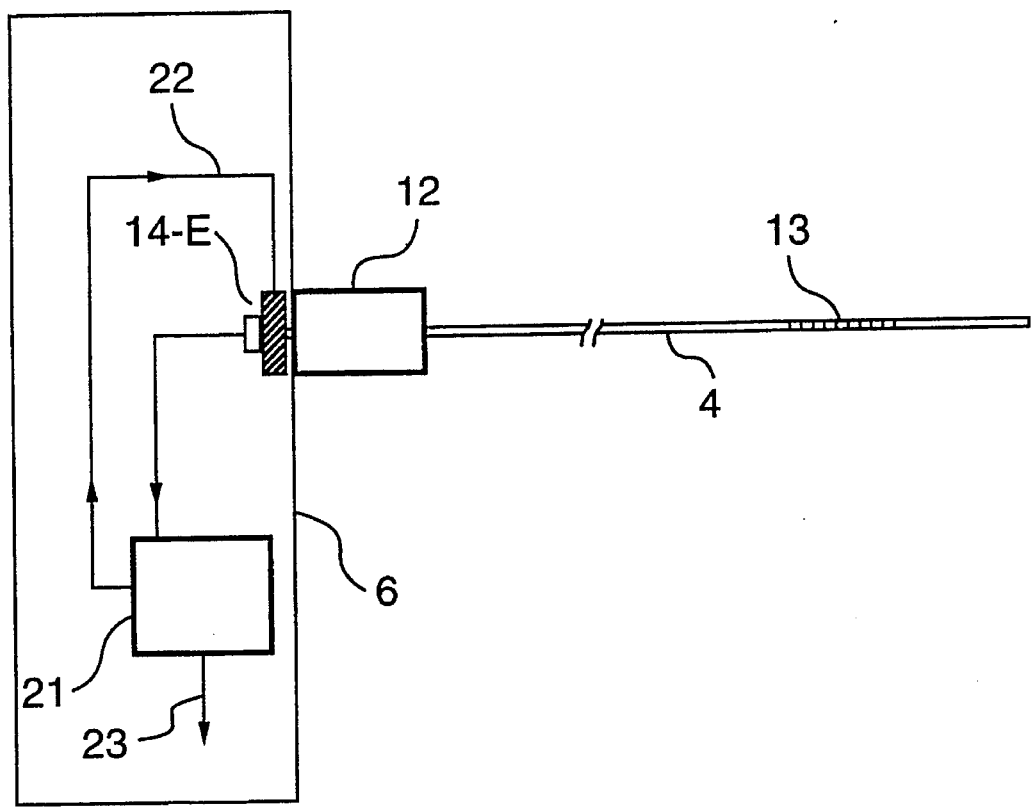
FIG. 11 shows the active wavelength demodulation system based on using only a single detector, wherein its spectral response function is rapidly switched between a reference state and a dynamic state used to track the laser wavelength in the manner described with respect to FIG. 10, the output of the structure of FIG. 11 is shown in FIG. 11A.
Figure 11A:
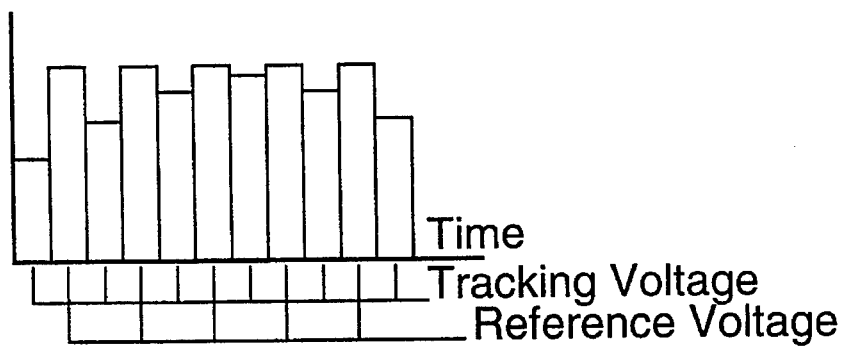

The embodiment with the "simplest and most compact architecture" arises when a single MQW EA device is used to perform both spectral filtering and detection functions. This is schematically illustrated in FIG. 11. Since it is possible to integrate the MQW EA device with the laser on the same monolithic substrate, the use of these devices in a single detector mode makes for the ultimate of simplicity in terms of architecture. As with the other single detector embodiment, FIG. 9, it is necessary to alternately switch between the reference and tracking {or scanning} modes. In this embodiment this is accomplished by alternately switching the reverse bias voltage between values that correspond to the reference spectral response function and the tracking {or scanning} spectral response function, see inset to FIG. 11. The disadvantages of a single-detector architecture include greatly increased complexity on the electronics side, and the loss of truly simultaneous wavelength-dependent and wavelength-independent detector readings—a problem if the wavelength signals to be measured change at very high speeds. In return, one greatly simplifies the system on the optical side, eliminating the need for both some form of splitter and a second detector. Given the large increase in cost and difficulty to manufacture optoelectronic integrated circuits with large numbers of components, a one-detector approach is probably well warranted where feasible.

In the case of a single detector based on a MQW EA device it is also possible to avoid the division of signals by wavelength translating the spectral response function to a point where the potential range of laser wavelength falls in a spectrally flat part of the spectral response function. The signal detected under these circumstances would serve as the spectrally unfiltered reference signal. The spectral response function would then be wavelength translated until the spectrally filtered signal matched some fixed proportion of the reference signal and the control signal applied to the MQW EA device at this point used to determine the absolute value of the laser wavelength.

Figure 12:
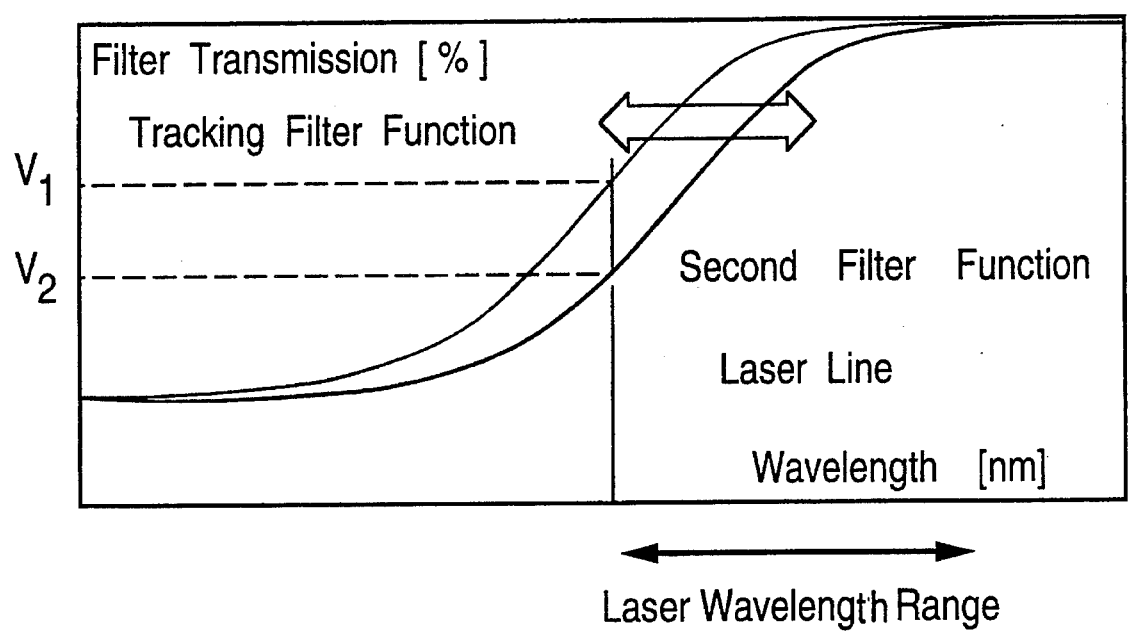
FIG. 12 illustrates, for the case of a bias voltage controlled spectral filter function, the technique for active wavelength demodulation based on rapidly switching between two spectral filter function wavelength settings. One of the settings is made to track the laser wavelength by adjusting the bias voltage while the other is locked to the first with a constant wavelength separation.

At least one MQW EA device reported to date seems to demonstrate the device characteristics needed for this approach, with a flat region of approximately 20 nm width at about 1540–1550 nm at a particular applied reverse bias voltage. A further explanation of this is found in "High-speed and low-driving-voltage InGaAs/InAlAs as multi-quantum well optical modulators", Electronics Letters, Vol. 27, No. 23 (1991): pp 2162–3. It is also possible to avoid the need for a flat region of the spectral filter function {or the detector spectral response function in the case of the MQW EA device} for the single detector approach by simply switching between two values of bias voltage and using the ratio of the resultant detector signals. The simplest embodiment of this approach arises when both spectral response curves have their linear sections in the wavelength measurement range of the Bragg grating laser sensor as in FIG. 12. Under these circumstances the Bragg laser wavelength $\lambda_B$ can be determined directly from the ratio of detector signals without any other reference, assuming that the time for switching between the two spectral filter {or response} functions is much shorter than the time for which the laser intensity or losses are likely to fluctuate. We assume the linear regions of the two spectral functions are given by:

$$F_1 = A\,[\lambda - \lambda_1(V_{bias\text{-}1})] \text{ and } F_2 = A\,[\lambda - \lambda_2(V_{bias\text{-}2})]$$

for the two values of bias voltage, and that the Bragg grating laser sensor has a Gaussian profile with a spectral width $\alpha\lambda$ and centre wavelength $\lambda_B$. Note that $\lambda_1$ and $\lambda_2$ are the respective wavelengths for which $F_1$ and $F_2$ are zero and are determined by the respective bias voltages: $V_{bias\text{-}1}$, and $V_{bias\text{-}2}$. Under these circumstances the ratio of the two detector signals, $V_1$ and $V_2$, takes the form:

$$V_1/V_2 = [\lambda_B - \lambda_1 + C]/[\lambda_B - \lambda_2 + C]$$

and is independent of the incident laser intensity. C is a constant that is proportional to $\alpha\lambda$, A is the common slope of the spectral filter (or detector response) functions. In which case the wavelength of the Bragg laser sensor:

$$\lambda_B = [C\{V_1/V_2 - 1\} + \lambda_1 - \lambda_2 V_1/V_2]/[1 - V_1/V_2]$$

In order to ensure that the linear slope of the spectral filter {or detector response} functions is always in the wavelength range of interest both of the bias voltages would have to track the laser wavelength.

Figure 13:
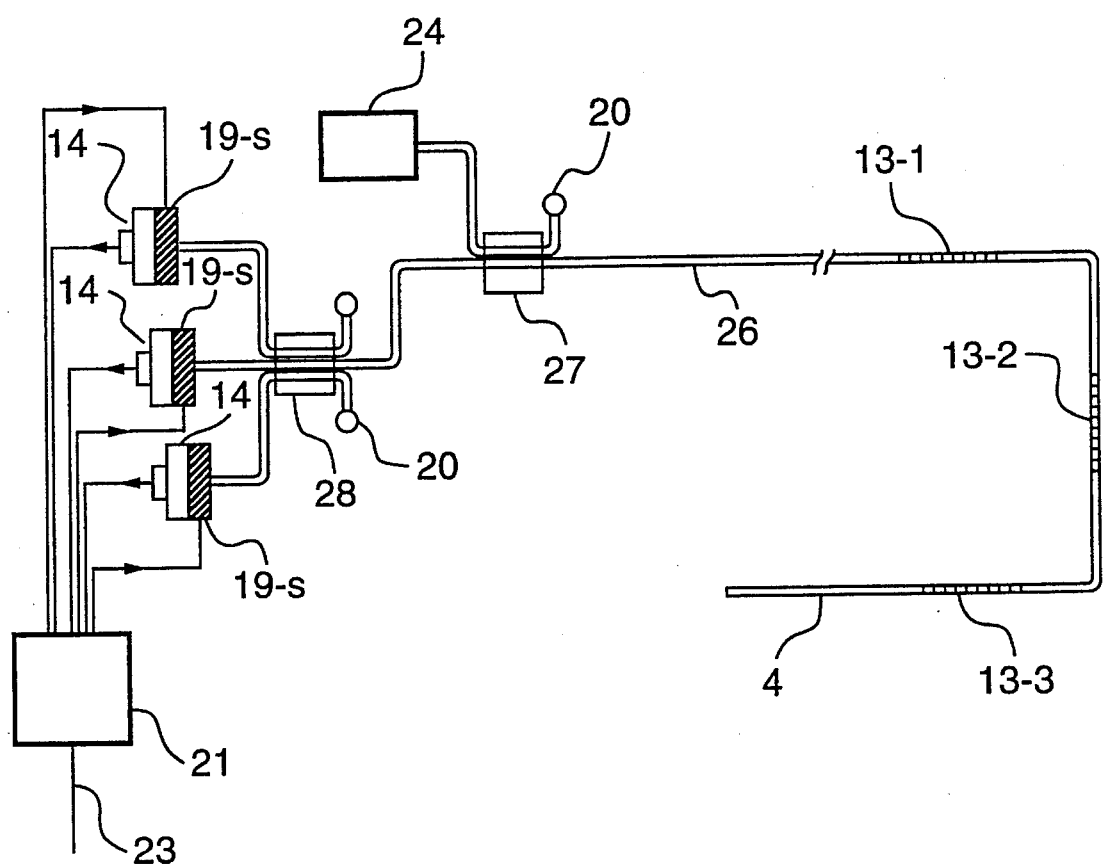
FIG. 13 is a further embodiment of the OSSI where fiber lasers are used in place of laser diodes and wavelength multiplexing permits several sensors along each optical fiber. The illustration indicates, how, in this system one fiber laser is made to lase at three different wavelengths, each tuned by a separate intracore Bragg grating sensor along the same optical fiber. In this arrangement each laser wavelength is evaluated by a single detector and a rapidly switched spectral filter.

In another alternative embodiment for the OSSI, each laser is forced to operate at several wavelengths corresponding to a number of Bragg gratings along each optical fiber. Each laser wavelength is monitored with its own active wavelength demodulation system. This arrangement allows wavelength multiplexing and can be demonstrated by replacing the semiconductor laser diodes with fiber lasers which are pumped by broadband high power semiconductor laser diodes. The large gain bandwidth of the fiber lasers makes possible wavelength multiplexing of several narrowband reflective sensors along each optical fiber. This is illustrated for the example of three such intracore Bragg gratings, 13 -1, 13 -2, and 13 -3, each operating at a different wavelength, in FIG. 13. In this case a (3× 3) waveguide coupler 28 is used to service the three detector 14- spectrally controlled filter 19-s combinations. In this example, each optical fiber 4 has a section that is doped to make it act as a fiber laser 26 when pumped by a high power laser diode 24 through a wavelength division multiplexer 27.

As can be appreciated, the methods and devices as described herein with respect to the systems which do not use a MQW EA as a detector, the filtered signal and the reference signal are preferably compared at different values of the control parameter until a predetermined relationship is achieved. This allows calculation of the wavelength and also compensates for source power variations and variable losses due to cancellation. The actual comparing step includes subtraction of the signals and/or division of the signals.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of determining the wavelength of a narrowband optical signal comprising processing the optical signal to produce a reference signal and a spectrally filtered signal, said spectrally filtered signal being produced by processing the optical signal through a spectral filter with a spectral transmission function that can be accurately wavelength translated by a control parameter which has been calibrated with respect to wavelength, comparing at different values of the control parameter the filtered signal and the reference signal to determine therefrom a value of the control parameter where a predetermined relationship of the spectrally filtered signal and reference signal is achieved, and using the value of the calibrated control parameter at the predetermined relationship to determine the wavelength of the narrowband optical signal, whereby the step of comparing the filtered signal and the reference signal compensates for source power variations and variable losses.

2. A method as claimed in claim 1 including using the compared reference and spectrally filtered signal relative to the predetermined relationship to provide a feedback for adjusting the control parameter which translates the spectral transmission function until the predetermined relationship is achieved.

3. A method as claimed in claim 1 wherein said step of comparing at different values of the control parameter is achieved by appropriately varying the value of the control parameter to repetitively scan a wavelength band of interest during which the predetermined relationship is achieved and the value of the control parameter is determined.

4. A method as claimed in claim 1 including rapidly alternating a single device between a first state and a second state, said first state producing the spectrally filtered signal and said second state producing said reference signal.

5. A method as claimed in claim 2 including rapidly alternating a single device between a first state and a second state, said first state producing the spectrally filtered signal and said second state producing said reference signal.

6. A method as claimed in claim 3 including rapidly alternating a single device between a first state and a second state, said first state producing the spectrally filtered signal and said second state producing said reference signal.

7. A method as claimed in claim 1 for determining the wavelength of a laser signal.

8. A method as claimed in claim 2 for determining the wavelength of a laser signal.

9. A method as claimed in claim 3 for determining the wavelength of a laser signal.

10. A method of determining the wavelength of a narrowband optical signal comprising processing the optical signal to produce a reference signal and a spectrally processed signal, said spectrally processed signal being produced by processing the optical signal through a device with a spectral response function that can be accurately wavelength translated by a control parameter which has been calibrated with respect to wavelength, comparing at different values of the control parameter the spectrally processed signal and the reference signal to determine therefrom a value of the control parameter where a predetermined relationship of the spectrally processed signal and reference signal is achieved, and using the value of the calibrated control parameter at the predetermined relationship to determine the wavelength of the narrowband optical signal, whereby the step of comparing the spectrally processed signal and the reference signal compensates for source power variations and variable losses.

11. A method as claimed in claim 10 wherein said step of spectrally processing the signal is carried out by means of a Multiple Quantum Well Electroabsorption Device, said Multiple Quantum Well Electroabsorption Device produces an electrical signal proportional to the optical power that is absorbed therein, and using said electrical signal as a measure of the spectrally processed signal during the step of comparing the spectrally processed signal with the reference signal;

and wherein said control parameter is a reverse bias voltage applied to the Multiple Quantum Well Electroabsorption Device whereby high speed wavelength translation can be achieved.

12. A method as claimed in claim 11 including using the compared reference and spectrally processed signal relative to the predetermined relationship to provide a feedback for adjusting the control parameter which translates the spectral response function until the predetermined relationship is achieved.

13. A method as claimed in claim 11 wherein said step of comparing at different values of the control parameter is achieved by appropriately varying the value of the control parameter to repetitively scan a wavelength band of interest during which the predetermined relationship is achieved and the value of the control parameter is determined.

14. A method as claimed in claim 11 including rapidly alternating the Multiple Quantum Well Electroabsorption Device between a first state and a second state, said first state producing the spectrally processed signal and said second state producing said reference signal.

15. A method as claimed in claim 12 including rapidly alternating the Multiple Quantum Well Electroabsorption Device between a first state and a second state, said first state producing the spectrally processed signal and said second state producing said reference signal.

16. A method as claimed in claim 13 including rapidly alternating the Multiple Quantum well Electroabsorption Device between a first state and a second state, said first state producing the spectrally processed signal and said second state producing said reference signal.

17. A method as claimed in claim 10 wherein said narrowband optical signal is a laser signal.

* * * * *